(12) United States Patent
Yamagata et al.

(10) Patent No.: US 6,226,046 B1
(45) Date of Patent: May 1, 2001

(54) VIDEO SIGNAL DISCRIMINATING CIRCUIT AND TELEVISION RECEIVER

(75) Inventors: Hiroshi Yamagata; Yoshinobu Tsunetomi, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/154,095

(22) Filed: Sep. 16, 1998

(30) Foreign Application Priority Data

Sep. 19, 1997 (JP) .................................................. 9-255547

(51) Int. Cl.[7] .......................... H04N 5/46; H04N 5/445; H04N 5/45
(52) U.S. Cl. .......................... 348/558; 348/445; 348/556; 348/193; 348/913; 348/704
(58) Field of Search ..................................... 348/558, 556, 348/193, 913, 445, 554, 555, 607, 722, 557, 439, 581, 458, 704; 382/300; H04N 5/46, 5/445, 5/45

(56) References Cited

U.S. PATENT DOCUMENTS

| | | | |
|---|---|---|---|
| 4,651,208 | * 3/1987 | Rhodes et al. | 348/445 |
| 5,218,436 | * 6/1993 | Sugiyama et al. | 348/445 |
| 5,309,234 | * 5/1994 | Kranawetter et al. . | |
| 5,353,065 | * 10/1994 | Katsumata et al. | 348/556 |
| 5,486,871 | * 1/1996 | Filliman | 348/558 |
| 5,581,304 | 12/1996 | Wang | 348/558 |
| 5,629,776 | * 5/1997 | Lagoni | 386/45 |
| 5,686,969 | 11/1997 | Baik | 348/556 |
| 5,719,636 | * 2/1998 | Ishii et al. | 348/558 |
| 5,760,840 | 6/1998 | Tani et al. | 348/558 |
| 5,805,234 | * 9/1998 | Matsuura | 348/558 |
| 5,844,624 | * 12/1998 | Nakai | 348/558 |
| 5,914,754 | 6/1999 | Kori | 348/555 |
| 5,949,494 | 9/1999 | Yagamata | 348/558 |
| 5,956,092 | * 9/1999 | Ebihara | 348/445 |

FOREIGN PATENT DOCUMENTS

| | | | |
|---|---|---|---|
| 0800311 A1 | * 10/1997 | (EP) . | |
| 080018884 | * 1/1996 | (JP) . | |
| 91/19390 A1 | * 12/1991 | (WO) . | |
| 94/19905 A1 | * 9/1994 | (WO) . | |

* cited by examiner

Primary Examiner—Matthew Luu
Assistant Examiner—Wesner Sajous
(74) Attorney, Agent, or Firm—Ronald P. Kananen; Rader, Fishman & Grauer

(57) ABSTRACT

A discrimination about a standard screen or a wide screen is performed by a discriminating circuit in accordance with the presence or absence of upper and lower black stripes of a wide screen video signal. A video signal transmitted through a low pass filter is supplied to the discriminating circuit, the presence or absence of the upper and lower black stripes of the video signal is detected and the discrimination about the standard screen or the wide screen is performed by the discriminating circuit. A noise level of the video signal is detected by an S/N ratio detecting circuit. Characteristics of the low pass filter are set in accordance with an output of the S/N ratio discriminating circuit.

4 Claims, 5 Drawing Sheets

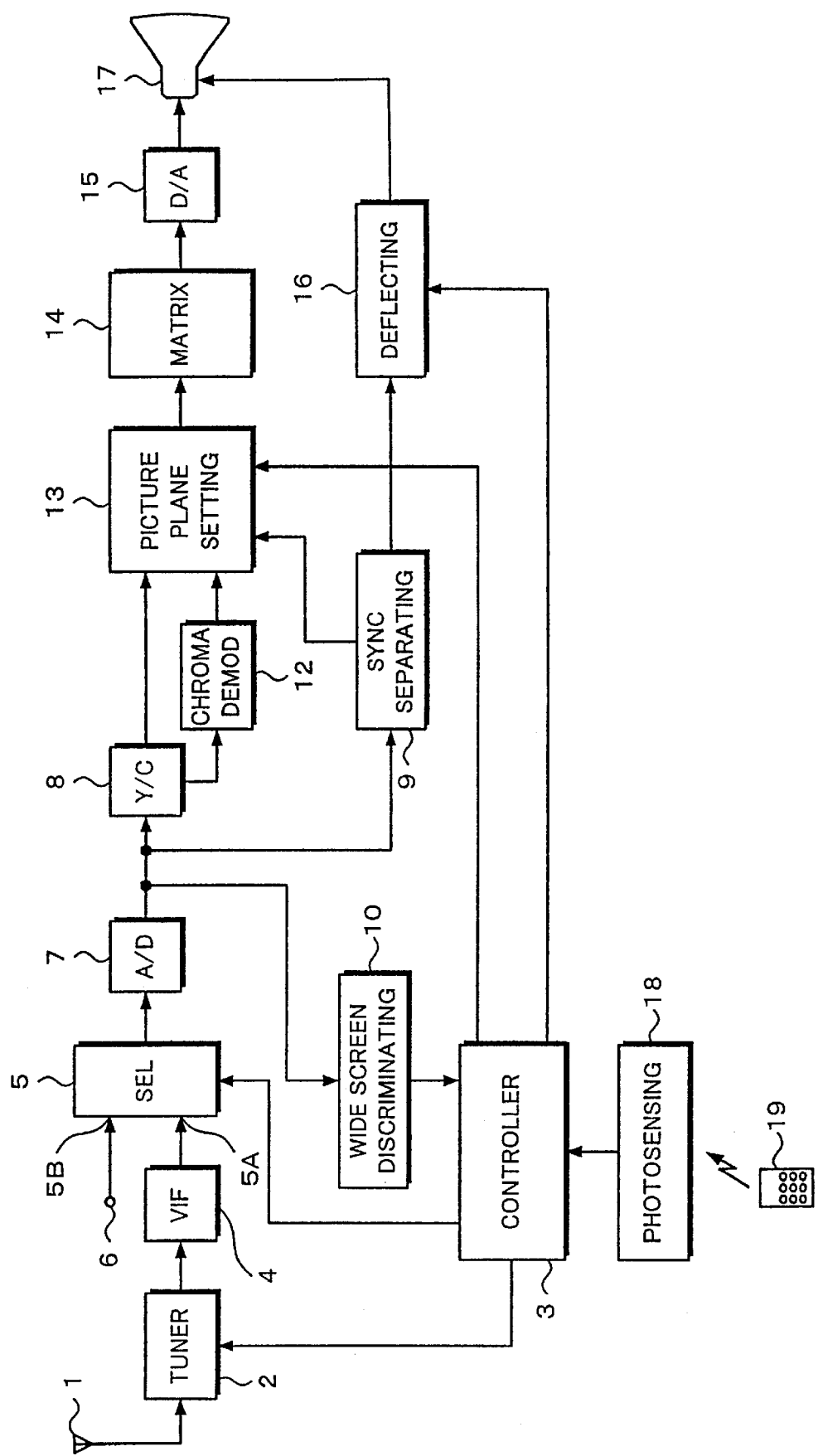

VIDEO SIGNAL DISCRIMINATING CIRCUIT AND TELEVISION RECEIVER

BACKGROUND OF THE INVENTION

1. Field of the Invention

The invention relates to a video signal discriminating circuit for discriminating whether a video signal which is inputted is in a standard screen or a wide screen format and a television receiver which has such a video discriminating circuit.

2. Description of the Related Art

In a television receiver of a wide screen having an aspect ratio of 16:9, besides a video source (hereinafter, referred to as a standard screen) of the screen of the existing NTSC system having an aspect ratio of 4:3, video signals of various aspect ratios such as video source of the screen having an aspect ratio of 16:9, video source (hereinafter, referred to as a wide screen) of a cinema size having an aspect ratio of 2:1, and the like are inputted. The television receiver has a function to switch a display mode in accordance with the aspect ratios of those video sources. In case of switching the display mode in accordance with such video sources, if it is switched by a manual operation, the operation is complicated and it is difficult to use. Therefore, a method of discriminating whether the inputted video signal is in the standard screen or the wide screen and switching the display mode in accordance with a discrimination result is used.

The discrimination about whether the inputted video signal is in the standard screen or wide screen can be performed by checking, for example, whether there are black stripe portions at the upper and lower positions of the screen or not. That is, FIGS. 1A and 1B show a standard screen and a wide screen. As shown in FIG. 1A, although there is no black stripe at the upper and lower positions of the screen in case of the ordinary screen, as shown in FIG. 1B, in case of the wide screen, black stripes B1 and B2 are caused at the upper and lower positions of the screen. Therefore, whether the screen is in the standard screen or the wide screen format can be discriminated by detecting video signal levels of the upper and lower positions of the screen and checking whether the upper and lower video signal levels of the screen are at the black level or not.

As mentioned above, in case of discriminating whether the screen is in the standard screen or the wide screen format by detecting whether there are the black stripe portions at the upper and lower positions of the screen, there is a case where it is difficult to discriminate in dependence on the scene. For example, in a scene of a night view, the whole screen is set to almost the black level. In such a case, it is difficult to discriminate whether the screen is in the standard screen format or the wide screen by checking whether the black stripe portions exist at the upper and lower positions of the screen. Even in a case where the upper and lower portions of the screen have a certain degree of luminance instead of the black stripes or a case where a caption signal of a a speech or the like has been superimposed in the upper and lower black stripes of the screen, it is difficult to discriminate about the standard screen or the wide screen.

Therefore, to prevent an erroneous discrimination between the standard screen and the wide screen in accordance with the scene, a method of obtaining a histogram of the video signal level of each line and discriminating about the standard screen or the wide screen has been proposed.

As mentioned above, whether the inputted video signal is of the standard screen or the wide screen can be discriminated by checking whether there are the black stripe portions at the upper and lower positions of the screen or not. However, when a signal to noise (S/N) ratio of the input video signal is low or the like, it is difficult to discriminate by checking whether there are the black stripe portions at the upper and lower positions of the screen or not.

That is, in a case where the video source is a reproduction signal of a VTR such that the dubbing has been repeated or a case where a television broadcasting is received in a weak electric field, the S/N ratio deteriorates and noises are generated on the screen. Therefore, if the S/N ratio of the video signal deteriorates, noises are mixed in the black stripe portions, the black stripe portion does not become perfect black, and a point of a high luminance is mixed. It is, therefore, difficult to discriminate whether the screen is the standard screen or the wide screen.

The method of discriminating about the standard screen or the wide screen by obtaining the histogram of the video signal level of each line is effective for discrimination in the scene of a night view because the feature of the picture plane is detected and whether the screen is the standard screen or the wide screen can be discriminated. In a case where the luminance level of the black stripe portions is high, since the discrimination luminance obtained by the histogram is also high, such a method is also effective in a case where the black stripe portion is not at the perfect black level. However, since the amplitude of noises is generally widely distributed in both of the upper and lower portions for the original signal, the discrimination luminance obtained from the histogram cannot take into consideration of an influence by the noises.

OBJECTS AND SUMMARY OF THE INVENTION

It is, therefore, an object of the invention to provide a video signal discriminating circuit which can accurately perform a discrimination about a standard screen or a wide screen even in the case where an S/N ratio of an input video signal deteriorates and to provide a television receiver which has such a video signal discriminating circuit.

According to the invention, there is provided a video signal discriminating circuit comprising: an S/N ratio discriminating means for detecting a noise level of a video signal and discriminating an S/N ratio from a noise level of the video signal; wide screen discriminating means for discriminating about a standard screen or a wide screen by the presence or absence of upper and lower black stripes of the video signal; and a low pass filter through which the video signal is allowed to pass, characterized in that the video signal transmitted through the low pass filter is supplied to the wide screen discriminating means, the presence or absence of the upper and lower black stripes of the video signal is detected by the wide screen discriminating means, thereby discriminating whether the screen is the standard screen or the wide screen, and characteristics of the low pass filter are set in accordance with an output of the S/N ratio discriminating means, and there is provided a television receiver which has such a video signal discriminating circuit.

According to the invention, the S/N ratio discriminating means comprises: non-video signal portion extracting means for extracting a video signal absent portion in the video signal; level detecting means for detecting a signal level of the video signal absent portion in the video signal extracted by the non-video signal portion extracting means; and noise level discriminating means for discriminating a noise level of the video signal from an output of the level detecting means.

The video signal transmitted through the low pass filter is supplied to the wide screen discriminating means. The presence or absence of the upper and lower black stripes is detected by the wide screen discriminating means, thereby discriminating about the standard screen or the wide screen. When the S/N ratio deteriorates, since the band of the low pass filter is narrowed, such noise components are reduced.

Thus, the discrimination about whether the screen is the standard screen or the wide screen can be correctly performed.

The above, and other, objects, features and advantage of the present invention will become readily apparent from the following detailed description thereof which is to be read in connection with the accompanying drawings.

BRIEF DESCRIPTION OF THE DRAWINGS

FIG. 2 is a block diagram showing a whole construction of a television receiver to which the invention can be applied;

DETAILED DESCRIPTION OF THE PREFERRED EMBODIMENTS

Figure 1B:
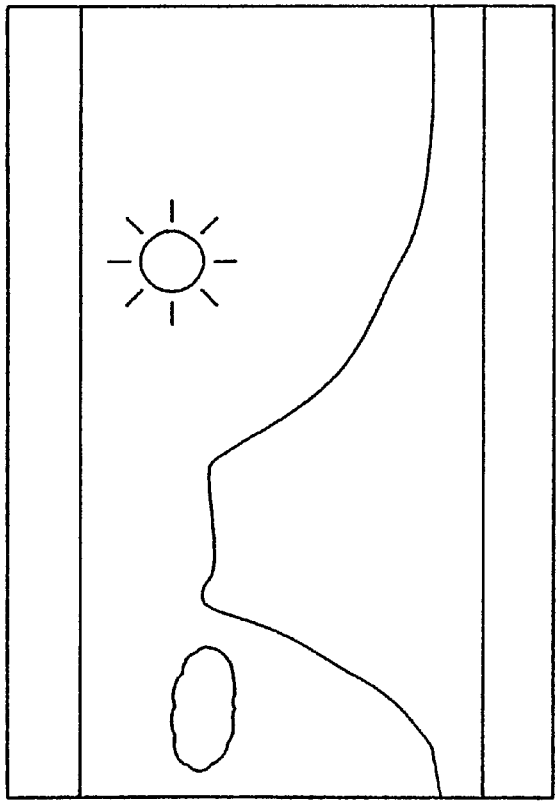
FIGS. 1A and 1B are schematic diagrams for use in explanation of a conventional wide screen discriminating circuit.
Figure 1A:
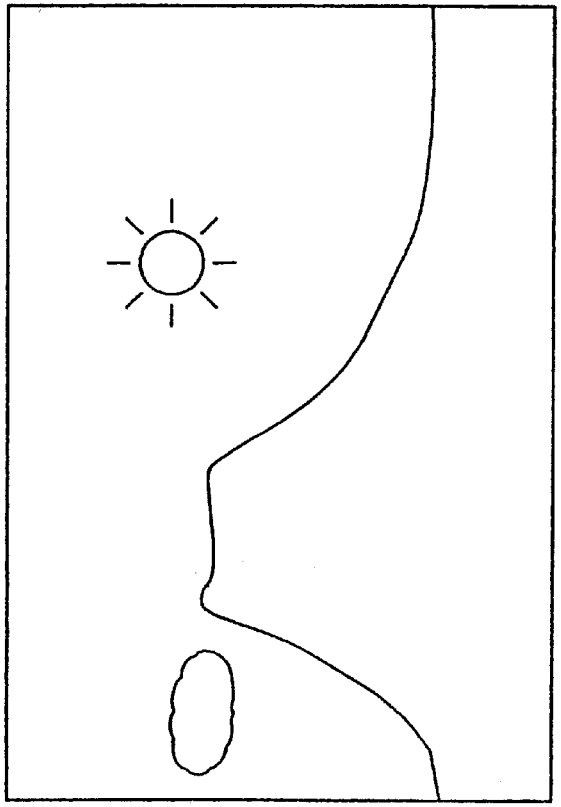

An embodiment of the invention will now be described hereinbelow with reference to the drawings. FIG. 2 shows an example of a television receiver to which the invention can be applied. In FIG. 2, a reception signal from an antenna 1 is supplied to a tuner circuit 2. A reception channel is set by the tuner circuit 2 on the basis of a channel set signal from a controller 3. In the tuner circuit 2, a signal of a desired channel is selected from the reception signal and this reception signal is converted into a predetermined intermediate frequency signal.

An output of the tuner circuit 2 is supplied to an intermediate frequency circuit (VIF) 4. In the intermediate frequency circuit 4, the output of the tuner circuit 2 is amplified and a video signal is detected. For example, a video signal of the NTSC system is outputted from the intermediate frequency circuit 4.

An output of the intermediate frequency circuit 4 is supplied to an input terminal 5A of a source selector 5. An external video signal from a video input terminal 6 is supplied to an input terminal 5B of the source selector 5. On the basis of a control signal from the controller 3, the input selector 5 switches the video signal received by the antenna 1 and the video signal from the external video input terminal.

An output of the input selector 5 is supplied to an A/D converter 7. The video signal is digitized by the A/D converter 7. An output of the A/D converter 7 is supplied to a Y/C separating circuit 8 and to a sync separating circuit 9. The output of the A/D converter 7 is supplied to a wide screen discriminating circuit 10.

Horizontal and vertical sync signals in the inputted video signal are detected by the sync separating circuit 9. The sync signal is supplied to a deflecting circuit 16 and to a picture plane setting circuit 13.

The wide screen discriminating circuit 10 discriminates whether the inputted video signal is the signal of the standard screen format or the signal of the wide screen. An output of the wide screen discriminating circuit 10 is supplied to the controller 3.

The video signal is separated into a luminance signal and a chroma signal by the Y/C separating circuit 8. The chroma signal separated by the Y/C separating circuit 8 is further supplied to a chroma demodulating circuit 12. Color difference signals R-Y and B-Y are demodulated from the chroma signal by the chroma demodulating circuit 12. The luminance signal from the Y/C separating circuit 8 and the color difference signals R-Y and B-Y from the chroma demodulating circuit 12 are supplied to the picture plane setting circuit 13.

The picture plane setting circuit 13 sets an aspect ratio and a picture plane position in accordance with whether the input video signal is the signal of the standard screen or the signal of the wide screen. The picture plane setting circuit 13 is constructed by, for example, an image memory. A size of picture plane can be set from the relation between a write clock and a read clock of the image memory, so that the aspect ratio can be changed. By shifting a reading start position of the image memory, the picture plane position can be set.

An output of the picture plane setting circuit 13 is supplied to a matrix circuit 14. A three-primary color signals are formed from the luminance signal and the color difference signals R-Y and B-Y by the matrix circuit 14.

An output of the matrix circuit 14 is supplied to a D/A converter 15. The three-primary color signal of the digital signals is converted into an analog signal by the D/A converter 15. An output of the D/A converter 15 is supplied to a wide image receiving tube 17 having an aspect ratio of 16:9.

The sync signal is supplied from the sync separating circuit 9 to the deflecting circuit 16. In the deflecting circuit 16, horizontal and vertical deflection currents are formed on the basis of the sync signal. The horizontal and vertical deflection currents are supplied to the image receiving tube 17.

Even by controlling the deflection currents from the deflecting circuit 16, the aspect ratio of the screen can be set.

An infrared rays signal from a remote commander 19 is supplied to the controller 3 through a photosensing unit 18. By the operation of the remote commander 19, the reception channel can be set and the display mode can be set.

In the television receiver to which the invention can be applied, the wide screen discriminating circuit 10 is provided as mentioned above. By the wide screen discriminating circuit 10, whether the inputted video signal is of the standard screen or the wide screen is discriminated. A discrimination signal from the wide screen discriminating circuit 10 is supplied to the controller 3. The controller 3 determines the display mode on the basis of the discrimination signal from the wide screen discriminating circuit 10. A set signal of the display mode is supplied to the picture plane setting circuit 13 or deflecting circuit 16. Thus, the aspect ratio and the display position are set in accordance with the display mode.

The invention is suitable when it is applied to the wide screen discriminating circuit 10 in such a television receiver.

Figure 3:
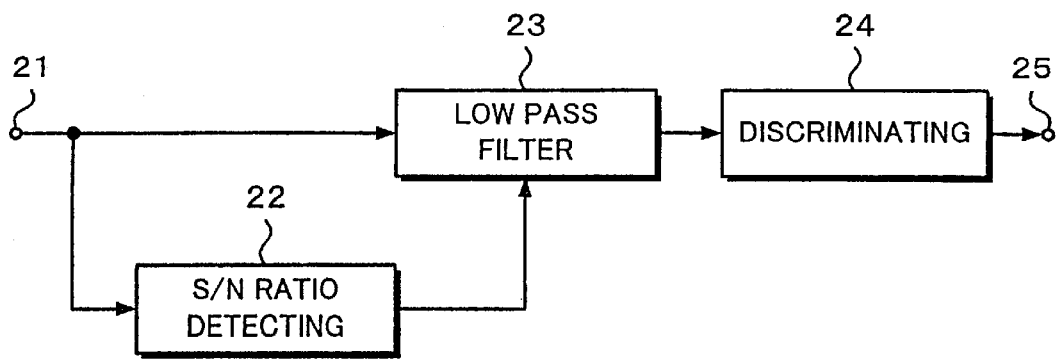
FIG. 3 is a block diagram of an example of a wide screen discriminating circuit to which the invention is applied.

FIG. 3 shows an embodiment of the wide screen discriminating circuit to which the invention is applied.

In FIG. 3, the video signal is supplied to an input terminal 21. The video signal from the input terminal 21 is supplied to a low pass filter 23 and to an S/N ratio detecting circuit 22.

The S/N ratio detecting circuit 22 detects a noise level of the inputted video signal. An output of the S/N ratio detecting circuit 22 is supplied to a low pass filter 23. Characteristics of the low pass filter 23 are set by the output of the S/N ratio detecting circuit 22. That is, whether a noise level of the inputted video signal is equal to or larger than a predetermined value or not is detected by the S/N ratio detecting circuit 22. When the noise level is smaller than the predetermined value, a band of the low pass filter 23 is widened. When the noise level is larger than the predetermined value, the band of the low pass filter 23 is narrowed.

Figure 4A:
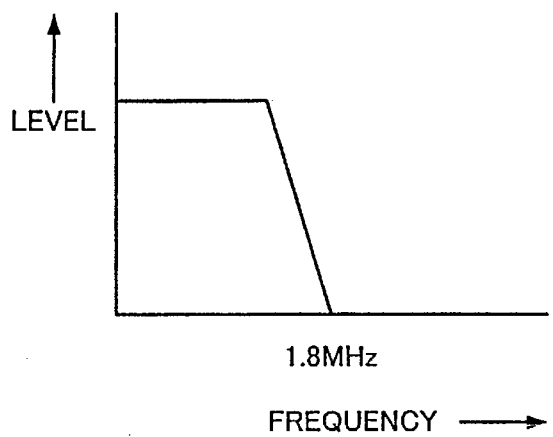
FIGS. 4A and 4B are graphs which are used for explanation of characteristics of a low pass filter in the wide screen discriminating circuit to which the invention is applied.
Figure 4B:
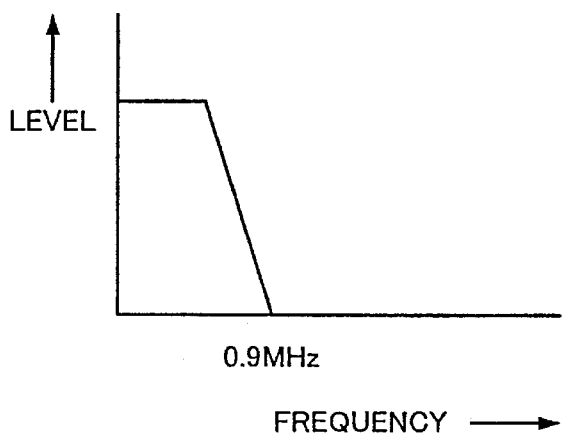

FIGS. 4A and 4B show examples of characteristics of the low pass filter 23. FIG. 4A shows the characteristics in the case where the noise level is equal to or smaller than the predetermined value. FIG. 4B shows the characteristics in the case where the noise level is equal to or larger than the predetermined value. As shown in FIG. 4A, when the noise level is equal to or less than the predetermined value, a cut-off frequency of the low pass filter 23 is set to, for example, about 1.8 MHz. As shown in FIG. 4B, when the noise level is equal to or larger than the predetermined value, the cut-off frequency of the low pass filter 23 is narrowed to, for example, about 0.9 MHz.

Figure 5:
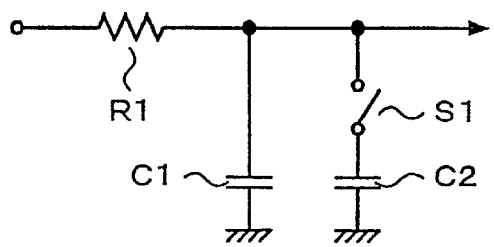
FIG. 5 is a block diagram for use in explanation of the low pass filter in the wide screen discriminating circuit to which the invention is applied.

In case of using an analog circuit, the low pass filter 23 whose band changes depending on a control signal from the outside can be constructed by a resistor R1, capacitors C1 and C2, and a switching circuit S1 as shown in, for example, FIG. 5. In FIG. 5, when the switching circuit S1 is ON, since a capacitance is equal to the sum of the capacitors C1 and C2, the cut-off frequency decreases. When the switching circuit S1 is OFF, since the capacitance is equal to only the capacitor C1, the cut-off frequency rises and the band is widened.

Figure 6:
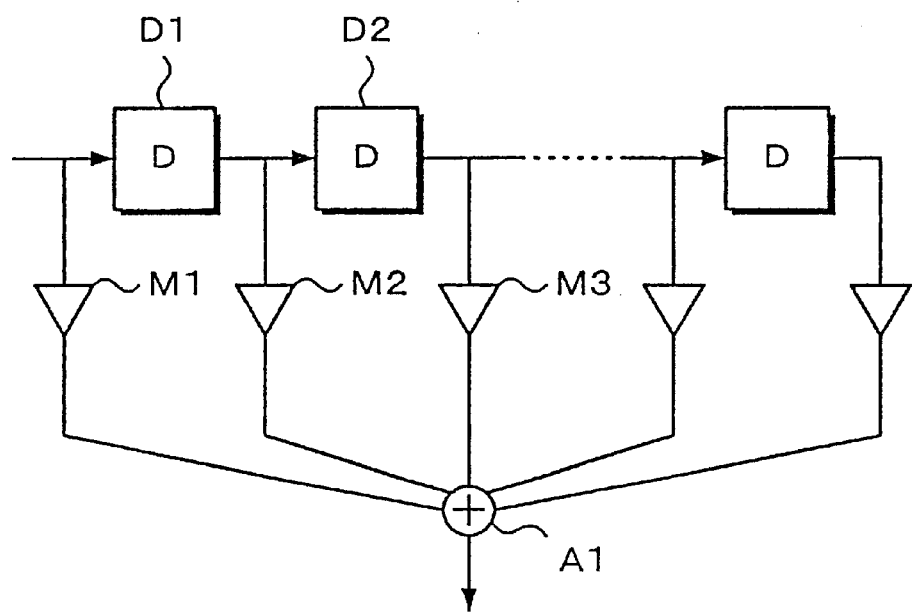
FIG. 6 is a block diagram for use in explanation of the low pass filter in the wide screen discriminating circuit to which the invention is applied.

In case of using a digital circuit, for example, as shown in FIG. 6, the low pass filter can be constructed by an FIR filter comprising delay circuits D1, D2, D3, . . . , multiplying circuits M1, M2, M3, . . . , and an adding circuit A1. By changing coefficients of the multiplying circuits M1, M2, M3, . . . , the band can be changed.

In FIG. 3, an output of the low pass filter 23 is supplied to a discriminating circuit 24. The discriminating circuit 24 detects the upper and lower black stripes of the screen and discriminates whether the video signal is in the standard screen or the wide screen format. That is, for example, when the upper and lower video signal levels of the screen are almost the black level although the video signal level of the center portion of the screen is equal to or larger than the predetermined value, it is determined that the screen is in the wide screen format. In the other cases, the standard screen format is decided. An output of the discriminating circuit 24 is outputted from an output terminal 25.

There is a case where the discrimination about the standard screen or the wide screen is difficult because of the nature of a scene. For example, in the scene at night, the whole screen is set to the black level and it is difficult to discriminate whether the screen is the standard screen or the wide screen. Even in the case where the upper and lower portions of the screen are not the black stripes but have a luminance of a certain extent or the case where a speech or the like has been superimposed in the upper and lower black stripes of the screen, it is difficult to discriminate whether the screen is the standard screen or the wide screen.

To prevent an erroneous discrimination about the standard screen or the wide screen depending on the scene, it is also possible to obtain a histogram of the video signal level of each line and to discriminate whether the screen is in the standard screen or the wide screen format.

Not only the discrimination about the standard screen or the wide screen but also the discrimination about whether subtitles have been superimposed in the wide screen or not can be performed.

As mentioned above, the low pass filter 23 whose band is changed in accordance with the S/N ratio of the video signal is provided for the wide screen discriminating circuit to which the invention is applied. Therefore, the erroneous discrimination due to the deterioration of the S/N ratio can be improved.

That is, when the S/N ratio of the video signal deteriorates, noises are generated in the black stripe portions and the signal of the black stripe portion is not set to the perfect black level. It is, therefore, difficult to discriminate about the standard screen or the wide screen. In the wide screen discriminating circuit to which the invention is applied, when the S/N ratio deteriorates, the band of the low pass filter 22 is narrowed. Therefore, such noise components are reduced. That is, now assuming that the frequency components of the noises are uniformly distributed, by setting the band to, for example, ½, the noise components are reduced into ½. Consequently, the discriminating circuit 24 can correctly perform the discrimination about the standard screen or the wide screen.

Figure 7:
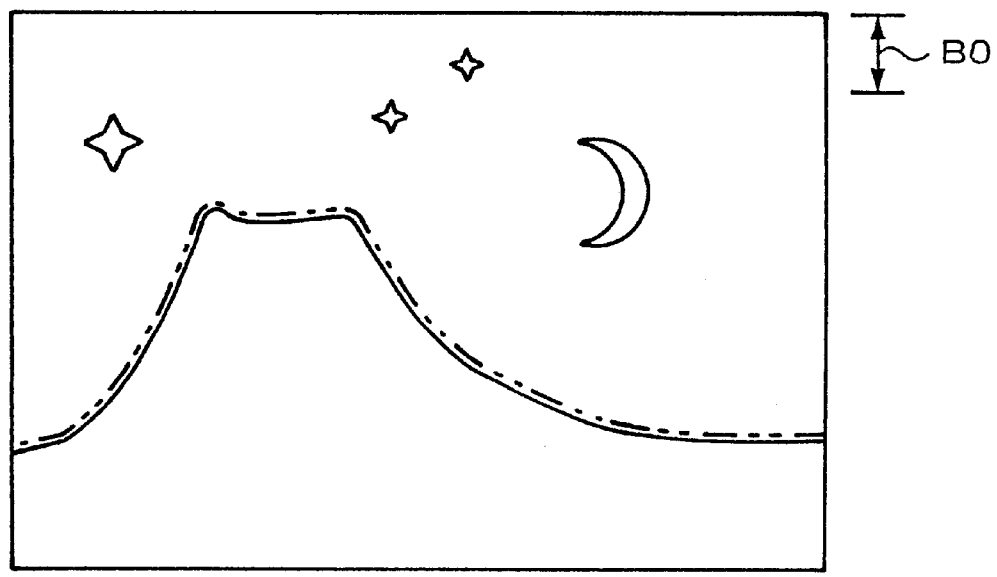
FIG. 7 is a schematic diagram for use in explanation of a wide screen.

When the S/N ratio is high, the band of the low pass filter 23 is widened. When the band of the low pass filter 23 is widened as mentioned above, since the characteristics of the black stripe portions can be discriminated, the discrimination in the case where the subtitles have been superimposed in the black stripe in the wide screen can be correctly performed. For example, as shown in FIG. 7, in the scene of a night view, the whole picture plane is set to the black level and it is difficult to discriminate the black stripe portions. When the band of the low pass filter 23 is widened, even in such a case, the characteristics of the portion of a black stripe BO can be discriminated.

Figure 8:
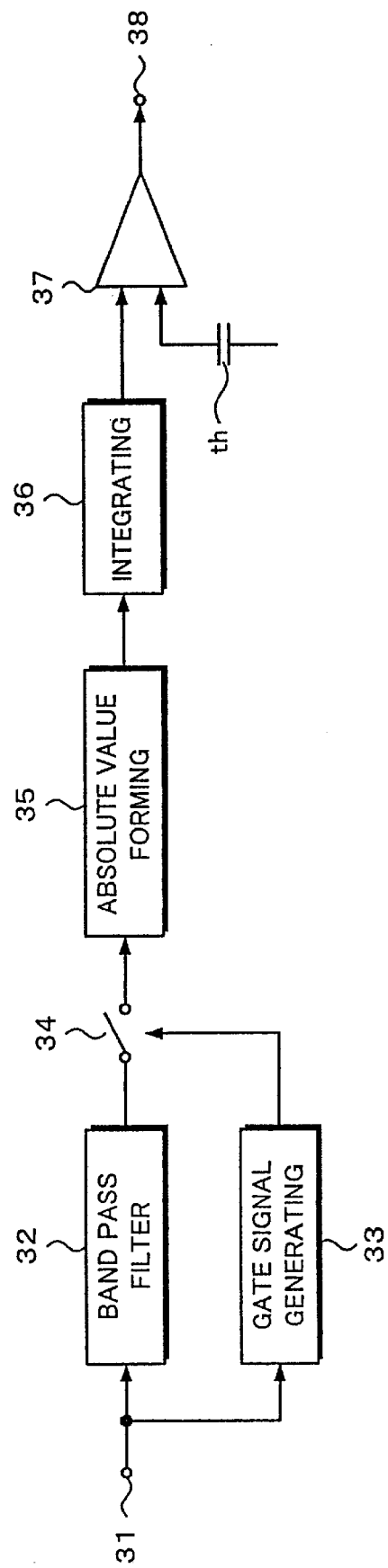
FIG. 8 is a block diagram of an example of an S/N ratio detecting circuit in the wide screen discriminating circuit to which the invention is applied.

The S/N ratio detecting circuit 22 can be constructed, for example, as shown in FIG. 8. In FIG. 8, the video signal is supplied to an input terminal 31. The video signal from the input terminal 31 is supplied to a band pass filter 32 and to a gate signal generating circuit 33. An output of the gate signal generating circuit 33 is supplied to a switching circuit 34.

The gate signal generating circuit 33 is provided to extract a video signal in a video signal absent period of time like a blanking interval or a sync signal interval. From the gate signal generating circuit 33, a gate signal is generated in a period of time when there is no video signal like a blanking interval or a sync signal interval. An output of the gate signal generating circuit 33 is supplied to the switching circuit 34. The switching circuit 34 is turned on in the video signal absent interval like a blanking interval or a sync signal interval by the gate signal from the gate signal generating circuit 33.

By the switching circuit 34, the video signal in the video signal absent period is extracted. An output of the band pass filter 32 transmitted through the switching circuit 34 is supplied to an absolute value forming circuit 35. By the absolute value forming circuit 35, the output of the band pass filter 32 is absolute valued. An output of the absolute value forming circuit 35 is supplied to a low pass filter 36.

By the switching circuit 34, the video signal in the video signal absent period like a blanking interval or a sync signal interval is extracted. Therefore, only the noise components are outputted through the switching circuit 34. The noise components are outputted through the switching circuit 34, the level of the noise components is detected by the absolute value forming circuit 35, and the noise component level is integrated by the low pass filter 36.

An output of an integrating circuit 36 is supplied to a comparator 37. A predetermined threshold level th is supplied to the comparator 37. The output of the integrated circuit 36 is compared with the threshold level th by the comparator 37. Whether the noise level in the video signal is equal to or larger than a predetermined value or not is discriminated by the comparator 37. An output of the comparator 37 is generated from an output terminal 38.

In the above example, the band of the low pass filter 22 is changed in accordance with whether the noise level of the input video signal is equal to or larger than the predetermined value or not in the S/N ratio detecting circuit 22. However, the band of the low pass filter 23 can be also linearly changed in accordance with the noise level amount of the input video signal.

According to the invention, the video signal transmitted through the low pass filter is supplied to the screen discriminating circuit, the presence or absence of the upper and lower black stripes of the video signal is detected and the discrimination about the standard screen or the wide screen is performed by the screen discriminating circuit. When the S/N ratio deteriorates, the band of the low pass filter is narrowed. Therefore, the noise components are reduced. Thus, the discrimination about the standard screen or the wide screen can be accurately performed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A video signal discriminating circuit comprising:
   a signal-to-noise (S/N) ratio discriminating means for detecting a noise level of a video signal and discriminating an S/N ratio from a noise level of said video signal;
   wide screen discriminating means for discriminating about a standard screen or a wide screen by the presence or absence of upper and lower black stripes of said video signal; and
   a low pass filter through which said video signal is allowed to pass,
   wherein said video signal transmitted through said low pass filter is supplied to said wide screen discriminating means, the presence or absence of the upper and lower black stripes of said video signal is detected by said wide screen discriminating means, thereby discriminating whether the screen is the standard screen or the wide screen, and
   wherein a characteristic of said low pass filter is set in accordance with an output of said S/N ratio discriminating means.

2. A video signal discriminating circuit according to claim 1, wherein said S/N ratio discriminating means comprises:
   non-video signal portion extracting means for extracting a video signal absent portion in said video signal;
   level detecting means for detecting a signal level of said video signal absent portion in said video signal extracted by said non-video signal portion extracting means; and
   noise level discriminating means for discriminating the noise level of said video signal from an output of said level detecting means.

3. A television receiver comprising:
   a video signal detecting means for detecting a received video signal,
   a video signal discriminating means for discriminating whether said received video signal is of a standard screen or a wide screen,
   a picture plane setting means for setting an aspect ratio and a picture plane position in accordance with an output of said video signal discriminating means; and
   a display means for displaying a picture based on said detected video signal,
   said video signal discriminating means having:
      a signal-to-noise (S/N) ratio discriminating means for detecting a noise level of a video signal and discriminating an S/N ratio from a noise level of said video signal;
      wide screen discriminating means for discriminating about a standard screen or a wide screen by the presence or absence of upper and lower black stripes of said video signal; and
      a low pass filter through which said video signal is allowed to pass,
   wherein said video signal transmitted through said low pass filter is supplied to said wide screen discriminating means, the presence or absence of the upper and lower black stripes of said video signal is detected by said wide screen discriminating means, thereby discriminating whether the screen is the standard screen or the wide screen, and
   and wherein a characteristic of said low pass filter is set in accordance with an output of said S/N ratio discriminating means.

4. A television according to claim 3, wherein said S/N ratio discriminating means comprises:
   non-video signal portion extracting means for extracting a video signal absent portion in said video signal;
   level detecting means for detecting a signal level of said video signal absent portion in said video signal extracted by said non-video signal portion extracting means; and
   noise level discriminating means for discriminating the noise level of said video signal from an output of said level detecting means.

* * * * *